INVENTOR
John R. Woodyard
BY
ATTORNEY

April 26, 1949.
J. R. WOODYARD
2,468,152
ULTRA HIGH FREQUENCY APPARATUS OF
THE CAVITY RESONATOR TYPE
Filed Feb. 9, 1943
3 Sheets-Sheet 2
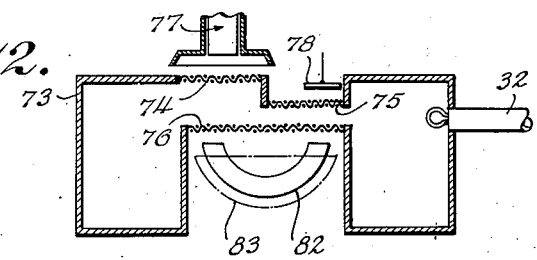
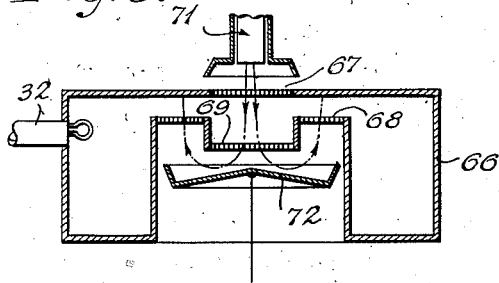
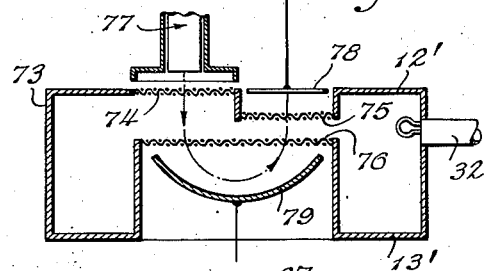
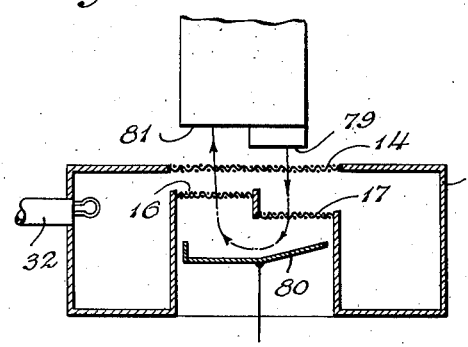
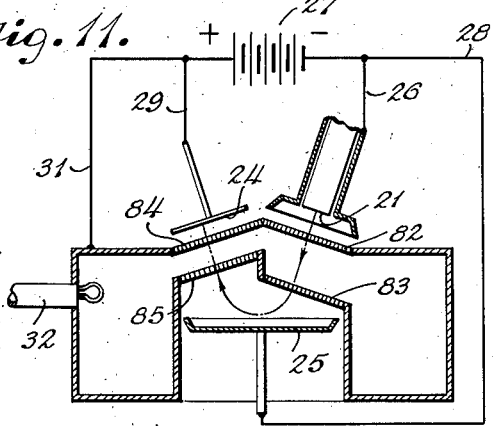
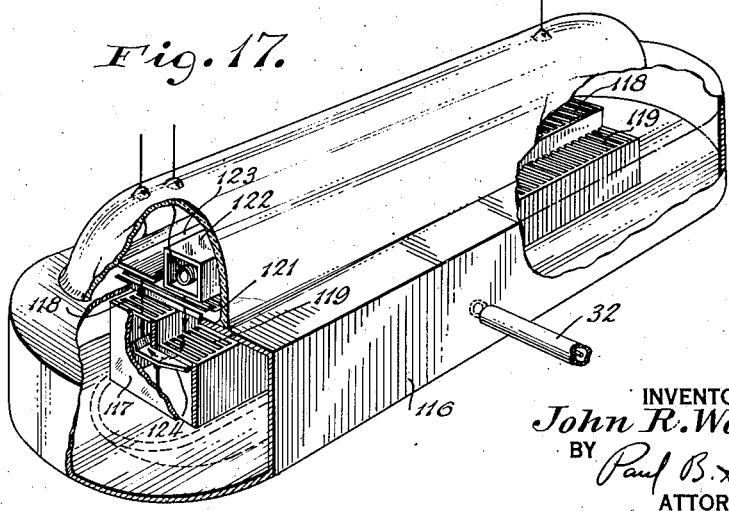
INVENTOR
John R. Woodyard
BY
Paul B. Hunter
ATTORNEY April 26, 1949.   J. R. WOODYARD   2,468,152
ULTRA HIGH FREQUENCY APPARATUS OF
THE CAVITY RESONATOR TYPE
Filed Feb. 9, 1943   3 Sheets-Sheet 3
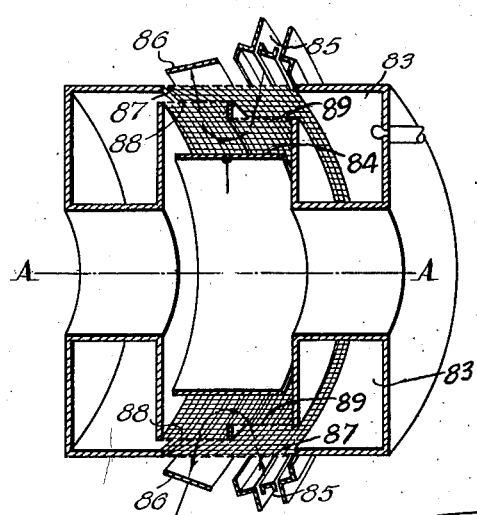
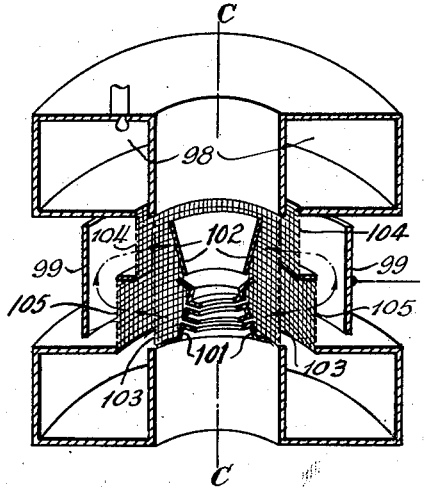
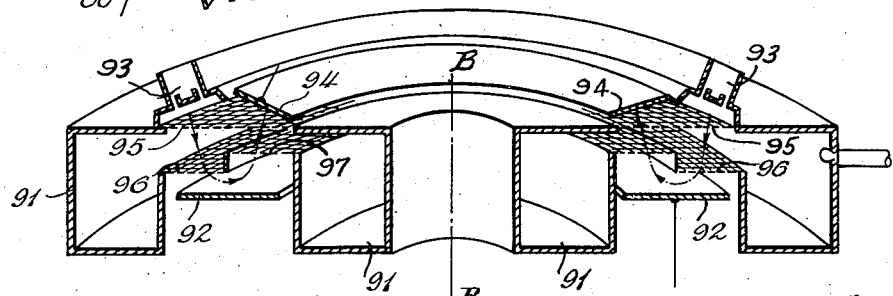
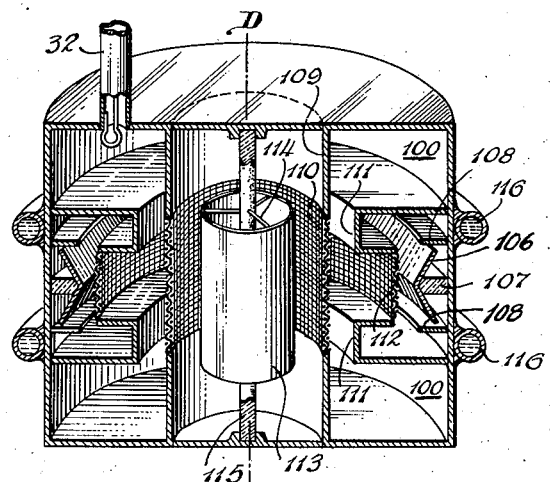
INVENTOR
John R. Woodyard
BY
ATTORNEY Patented Apr. 26, 1949

2,468,152

UNITED STATES PATENT OFFICE 2,468,152

ULTRA HIGH FREQUENCY APPARATUS OF THE CAVITY RESONATOR TYPE

John R. Woodyard, Garden City, N. Y., assignor to The Sperry Corporation, a corporation of Delaware Application February 9, 1943, Serial No. 475,308

23 Claims. (Cl. 315—5)

This invention relates to high frequency apparatus and is especially concerned with high efficiency high frequency apparatus of the electron velocity variation type operating on reflex principles.

A reflex type electron velocity variation device, as contemplated by my invention, is a device wherein a beam of electrons is passed through an oscillating electromagnetic field in such fashion that the electrons are subjected to velocity variation by the action of the field, and then after having passed through the field the beam is deflected back through the same field in energy interchanging relation therewith.

According to ordinarily given and used definitions, the potential difference or voltage between two points in an electric field is defined as the line integral of the electric field intensity taken from the first point to the second point. It has further usually been stated that this potential difference or voltage depends on the path of integration through the electric field, when alternating electromagnetic fields are present. That is, it is necessary to know the path in space followed by a given charge such as an electron in order to calculate the potential difference acting on that charge. In these prior calculations, it has been assumed that the charge travels between the two points instantaneously, and the calculated potential difference defines the work done on the charge when the transit time between the two points is neglected or negligible.

However, when the charge is passed through an ultra high frequency electromagnetic field, as is the case in apparatus of the type contemplated by the invention, the transit time of the charge in passing through the field may become important. It is then necessary to know the path of the charge both in space and in time in order to find the work done on the charge. Such is the case because the rapidly changing field exerts a force on the electron which is a function of both its position in space and time. The work done on a unit charge can be expressed in volts or potential difference in the usual manner, and this voltage will hereinafter be referred to as the "effective" voltage or "effective" potential difference. This should not be confused with the use of the word "effective" to indicate root-mean-square values as is sometimes done in alternating current theory.

In the types of resonators considered here, the effective voltage will always be less than the ordinary voltage which assumes an electron of infinite velocity. If the transit time is very small, the effective voltage will be almost equal to the ordinary voltage. If the transit time is a whole number of cycles, the effective voltage will be zero. It is therefore possible to control the effective voltage, which is the useful voltage acting on the electron beam, to any desired value by controlling the electron transit time. This principle is made use of in the present invention to increase the efficiency of a reflex type electron velocity variation device.

The invention will be described in its preferred embodiment as embodied in reflex type apparatus wherein the oscillating electromagnetic field is contained within a cavity resonator device and the electron beam is successively passed through suitable electrode structures in walls of the device. Apparatus of this type is generally known, as disclosed in Figure 2 of United States Letters Patent to Varian et al. No. 2,250,511, for example.

Such known high frequency reflex type apparatus employing cavity resonator devices have been used widely as oscillators, but they are so low in efficiency that these uses have not been extended beyond relatively low power devices. Since such known reflex apparatus possess many other desirable operational features such as ease of tuning which could be availed of to improve the operation of high power transmitters and the like, attempts have been made to materially increase their efficiency but to my knowledge none have been successful before my invention. Prior to my invention, it was therefore widely accepted that any reflex device of this type was subject to inherent low efficiency, and was available only for relatively low power apparatus.

My invention contemplates new reflex type cavity resonator structures having relatively high efficiency as compared to the above-discussed known reflex apparatus, and represents practical adaptation of reflex apparatus to high power fields.

It is therefore a major object of my invention to provide a novel high frequency apparatus of the reflex type which is of simple mechanical construction and unusually high electrical efficiency.

A further object of the invention is to provide a novel ultra high frequency apparatus of the reflex type wherein an electron beam is passed through a high frequency oscillating field in such fashion that the electrons are subjected to velocity variation by action of the alternating field, and the beam is then returned through the field, the effective voltage acting on the returned beam being higher than the effective voltage acting on the beam during initial traverse.

A further object of the invention is to provide ultra high frequency apparatus of the reflex type wherein an electron beam is subjected to the action of an electromagnetic field oscillating within a cavity resonator device of novel construction.

It is a further object of the invention to provide a novel high efficiency apparatus of the reflex type embodying a cavity resonator device having novel electrode construction.

A further object of the invention is to provide a high efficiency apparatus of the reflex type embodying a novel cavity resonator device wherein the output electrodes are spaced apart a different distance than the input electrodes. By the term "input electrodes" is meant those electrodes or electrode portions defining a gap whose electric field serves to initially velocity-modulate the electrons of the stream. By "output electrodes" is meant those electrodes or electrode portions defining a gap whose electric field serves on the average to extract high frequency energy from the velocity-modulated and velocity-grouped electron stream in the reflex device. Preferably the output electrodes are spaced apart a smaller distance than the input electrodes. The invention contemplates application of this object to a wide variation in resonator and electrode shapes as will appear in the following specification.

A further object of my invention is to provide novel high power ultra high frequency apparatus of the reflex type wherein the resonator chamber is in the form of a figure of revolution or translation of a desired cross-section.

Further objects of the invention will presently appear as the description proceeds in connection with the appended claims and the annexed drawings, wherein Figure 1 is a substantially diagrammatic elevation partly in section illustrating the basic principles of the invention.

Figures 8, 9, 10 and 11 are diagrammatic elevations partly in section also similar to Figure 1, but showing still further cathode and grid arrangements.

Figure 12 is a partially diagrammatic elevation partly in section illustrating a magnetic deflector for returning the electron beam.

Figures 13, 14 and 15 are diagrammatic representations of higher power devices obtained by revolution of the cross-section of Figure 1 about axes A—A, B—B and C—C as indicated.

Figure 16 is a perspective view, partly in section, of a further high power reflex type device according to the invention, obtained by revolution of the cross-section of Figure 4 about an axis D—D.

Figure 17 is a perspective view partly broken away and in section illustrating a reflex type device obtained by translation of the cross-section of Figure 1.

Figure 2:
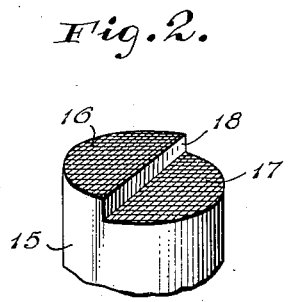
Figure 2 is a perspective view illustrating a portion of the electrode structure of Figure 1.

In known reflex type cavity resonator devices, the same electrodes serve as both input and output electrodes, the returned beam being substantially exactly reversed in direction as disclosed in Figure 2 of said Patent No. 2,250,511. Thus the high frequency voltages applied by the field to the electron beam during the electron velocity variation operation are of the same amplitude as the high frequency voltages applied by the field to the returned beam during the output energy extraction. This circumstance results in low efficiency in operation.

According to my invention, the effective output voltage applied to the beam by the high frequency field in a reflex device is made appreciably higher than the effective input voltage applied to the beam during the electron velocity variation operation. This materially increases the efficiency of the device. I find that this may best be accomplished practically by providing an output electrode spacing designed for optimum efficiency and spacing the input electrodes a suitably greater distance to obtain a desired lower effective input voltage thereacross. It will be understood, however, the desired effective voltages and operation may be obtained under certain conditions by suitably spacing the output electrodes farther apart than the input electrodes, and the invention in its broadest sense is herein claimed to cover such arrangements as well as the preferred relative spacing.

Figure 1:
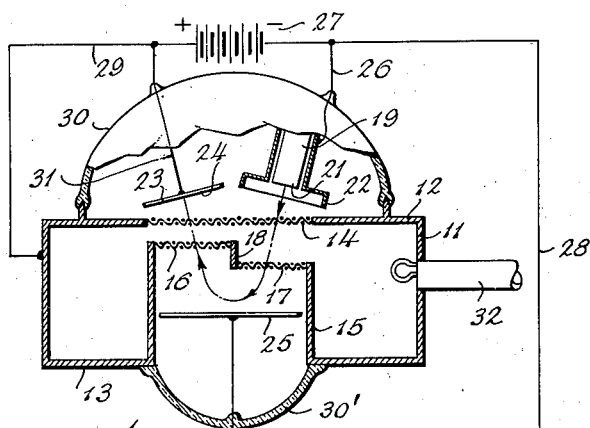

Referring now to Figure 1, a hollow right cylindrical shell 11 of metal is provided with parallel flat end walls 12 and 13. Upper wall 12 is formed with an electron permeable portion comprising an axially centered circular grid electrode 14. A cylindrical reentrant pole 15 is rigidly mounted on wall 13, being preferably integral therewith, and terminates in the stepped grid electrode structure shown in Figure 2. This electrode structure comprises grid regions 16 and 17 preferably parallel to grid 14 and spaced different distances from grid 14. Grid regions 16 and 17 are preferably semicircular, and are interconnected by a support plate 18 extending diametrally of the pole. In this figure, grid region 17 and the portion of grid 14 directly opposite serve as a pair of input electrodes or grids defining an input electrode gap, while grid region 16 and the other portion of grid 14 directly opposite thereto serve as a pair of output electrodes or grids, defining an output electrode gap. While grids 14, 16 and 17 may be of any electron permeable construction, a desirable practical construction is the meshed wire structure illustrated, which has low electron interception properties. Externally of shell 11 is fixedly mounted a cathode assembly 19 having an emitting surface 21 arranged at a suitable angle with respect to the cylinder axis. Surface 21 which may be of any desired shape is surrounded by the usual focusing shield 22. As illustrated, the cathode assembly is located adjacent the wider spaced electrode regions; that is, near the electrode gap defined by one portion of grid 14 and grid 17.

A conducting collector electrode or electron catcher 23 is fixedly mounted externally of shell 11 adjacent the narrower electrode gap defined by grids 14 and 16. The collector face 24 of electron catcher 23 is preferably arranged at substantially the same angle relative to the cylinder axis as cathode face 21.

A reflector electrode 25 is secured within the field free space enclosed by pole 15 but externally of shell 11. This reflector is preferably a conductor plate having a flat deflecting face preferably arranged substantially normal to the cylinder axis.

The cathode assembly is energized in a suitable manner (not shown) and is maintained at a relatively high negative potential by a lead 26 connected to the negative terminal of battery 27. The reflector is maintained substantially at cathode potential, as by lead 28. The positive terminal of battery 27 is connected by lead 29 to shell 11, and by lead 31 to electron catcher 23. If desired, wall 12 may be extended coextensive with grid 16 so that the extended wall portion serves as the electron catcher. In such event, of course, grid 14 need be substantially coextensive only with grid 17, and electrode 23 and lead 31 would be omitted.

A conventional coaxial line assembly 32 may be coupled with the resonator for extracting high frequency energy.

Insulator glass caps 30 and 30' enclose and suitably support the cathode and collector structure and the reflector structure, respectively, as illustrated. These caps are sealed in gas-tight joints to the shell 11 and to the various electrical leads passing therethrough, so that the interior of the device may be maintained in evacuated condition.

In operation, a beam of electrons emitted from cathode surface 21 which is heated by a suitable filament (not shown) is projected through the input electrode gap between grids 14 and 17. Since reflector 25 has about the same negative potential as the cathode, the beam does not strike reflector 25 but is deflected electrostatically to pass through the output electrode gap between grids 16 and 14. The inclined disposition of the cathode relative to the cylinder axis, and the relative locations of charged reflector 25 and the cathode are chosen to insure that substantially all the electrons projected through the input gap are returned through the field but at the output gap. In turn, collector 23 is preferably positioned for maximum interception of the electrons emerging from the output electrodes.

Shell 11 is a cavity resonator device enclosing an alternating electromagnetic field oscillating at its ultra high resonant frequency, in the neighborhood of $10^9$ cycles per second. Resonator devices of the illustrated type are self-excited. During initial traverse of the input electrode gap by the electron beam, an initial small oscillatory field is set up between grids 14 and 17 due to thermal agitation or some other condition of non-uniformity in density or electron velocity in the beam, in the well-known manner. This alternating field acts upon the beam to alternately accelerate and slow down the electrons to cause electron grouping in the beam during travel of the beam in the alternating field-free space between grids 17 and 16. While passing through the output gap, the electron velocity-varied beam gives up a part of its energy to the common oscillating field which is proportionately increased in strength. This increased strength field in turn acts on the beam at the input gap to cause more definite electron grouping, and the process is cyclic until the resonator has been excited to full oscillation at resonant frequency. This phenomenon of self-excitation is known, and substantially described in United States Letters Patent No. 2,242,275, to which reference is made for further particulars.

In operation, the oscillatory high frequency field within resonator shell 11 continuously performs its electron velocity variation operation at the input electrodes and derives sustaining energy from the velocity grouped electron beam at the output electrodes. For maximum efficiency according to the preferred form of the invention, I arrange the spacing of grids 14 and 16 at the optimum distance for applying the maximum high frequency effective output voltage to the electron beam, and then space grids 14 and 17 at an appreciably greater distance so that the beam is subjected to a much lower effective voltage in traversing the input gap. The effective voltage across grids 17 and 14 need only be sufficiently high to accomplish the required electron grouping, which requires relatively little energy. For example, in a resonator 11 designed to have a resonant wavelength of about 10 centimeters, I find that the output grid spacing may be between one-quarter and one-half of the electron wavelength at resonant frequency, while the corresponding input grid spacing would lie between one-half to one electron wave-length, depending upon other general design conditions. At least one spacing is preferably greater than one-half electron wavelength. By electron wavelength is meant the distance traveled by an electron in the time of one cycle.

I have found that the above-described construction and operation fulfills the basic objects of my invention in that a reflex type cavity resonator device of high efficiency is obtained, thus adapting such devices for use in hitherto inaccessible high power fields. The same principles are embodied in the structural phases of the invention to be described herein by way of further example of the scope of the invention.

Figure 3:
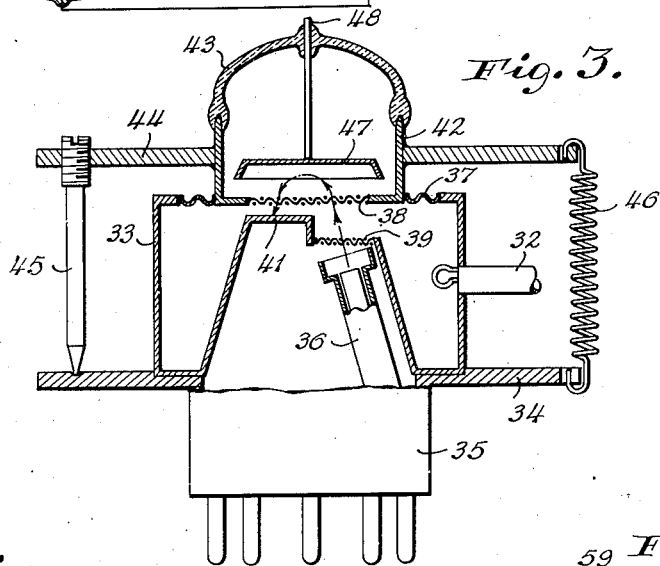
Figure 3 is an elevation partially in section illustrating a practical embodiment of the principles of Figure 1.

Figure 3 illustrates a practical embodiment of the general form of the invention explained in Figures 1 and 2. A cylindrical cavity resonator 33 is rigidly seated in a rigid annular metal platform 34 carried by the usual pronged insulating tube base 35. An inclined cathode assembly 36 is carried by base 35. The upper flat end wall of cylinder 33 is formed with an annular crimped portion 37 and a central grid 38. The lower end wall is formed with a reentrant frustro-conical pole terminating in stepped sections comprising grid 39 and flat wall 41 both parallel to grid 38. Grid 39 and the opposite portion of grid 38 form input electrodes, while wall 41 and the other portion of grid 38 opposite thereto form output electrodes.

Inwardly of crimped section 37 a metal collar 42 is secured to the top wall of the cylinder, and a gas-tight glass closure cap 43 is sealed to collar 42. Collar 42 is also provided with radial arms 44 connected to platform 34 by suitable tuning adjustment screws 45 and springs 46.

A reflector 47 is supported within the tube adjacent grid 38, as from the metal terminal 48 sealed in the closure cap. The interior of the tube is evacuated and sealed off.

The operation of the tube of Figure 3 is substantially the same as above described for Figure 1, inclined cathode 36 directing a beam of electrons through the widely spaced input electrode gap between grid 39 and the portion of grid 38 opposite thereto, where the electrons are subjected to velocity variation by the action of the oscillatory field, and reflector 47 returning the beam through the field at the narrowly spaced output gap between wall 41 and the portion of grid 38 opposite thereto. Wall 41 serves as an electron catcher or collector electrode in this embodiment.

Figure 4:
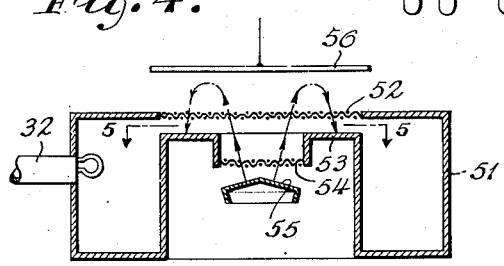
Figure 4 is a substantially diagrammatic elevation similar to Figure 1, but illustrating a further embodiment of the invention having different cathode and grid arrangements.
Figure 5:
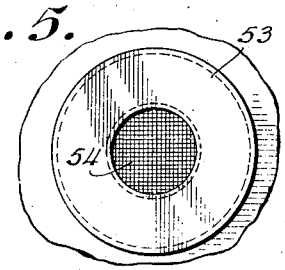
Figure 5 is a section along line 5—5 in Figure 4.

Figures 4 and 5 illustrate a further embodiment of the invention wherein the resonator and grid structures are different from the above. Here right cylindrical resonator shell 51 has a circular grid electrode 52 in one end wall. The other end wall is formed with a reentrant pole terminating in a stepped electrode structure consisting of an annular flat wall 53, which also serves as a collector electrode, and a circular central grid 54 spaced farther from electrode 52 than wall 53. In this manner, the output electrodes, formed by annular surface 53 and the portion of grid 52 opposite thereto, substantially surround the input electrodes, formed by grid 54 and the portion of grid 52 opposite thereto.

A cathode having a substantially conical emission face 55 is mounted adjacent grid 54 while a suitable reflector 56 is located adjacent grid 52. As shown by the arrows in Figure 4, a generally annular divergent beam of electrons is projected from the cathode through the lower voltage input electrode gap between grids 54 and 52, and charged reflector 56 returns the beam through the higher voltage output electrode gap between grid 52 and collector 53. The inclination of the cathode surface is employed to provide proper directivity for the beam. The action of the oscillatory field on the beam, and other features of the structure and operation of the tube, are the same as described for Figure 1.

Figure 6:
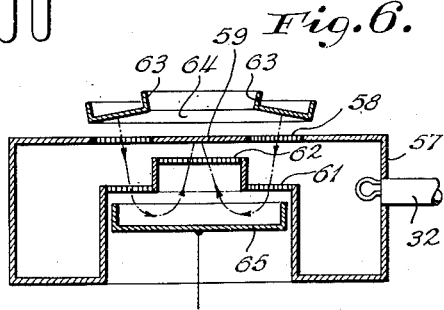
Figure 6 is a further diagrammatic elevation partly in section illustrating a further embodiment of the invention having still different cathode and grid structure.
Figure 7:
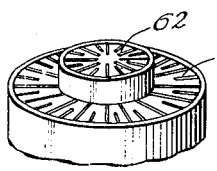
Figure 7 is a perspective view illustrating part of the grid structure in Figure 6.

In Figures 6 and 7, the right cylindrical resonator shell 57 has one end wall formed with a centered annular grid 58 surrounding a circular flat plate 59 serving as a collector electrode and as one of the output gap electrodes. Plate 59 may be integral with the resonator end wall, being connected thereto by integral radial sections (not shown) for support. The other end wall is formed with the usual cylindrical reentrant pole terminating in annular grid 61, coextensive with grid 58, and a central circular grid 62 coextensive with plate 59. Annular grids 58 and 61 form input electrodes and define the input gap therebetween. Circular grid 62 and circular collector electrode 59 form output electrodes and define the output gap therebetween.

An annular cathode 63, having its emission surface in the form of an internal frustro-conical face 64, is aligned with grid 58. A cup-shaped reflector 65 is arranged adjacent the other end wall of the resonator.

A convergent, generally annular electron beam is projected from surface 64 through the lower voltage input electrode gap between grids 58 and 61, to be returned by reflector 65 through the higher voltage output gap defined by grid 62 and plate 59.

Figure 8 is generally similar to Figures 4 and 6 but has different electrode arrangements. A hollow cylindrical resonator shell 66 has a centered grid electrode 67 in one end wall, the other end wall being formed with a reentrant pole terminating in an annular grid 68 and a central circular grid 69. The spacing between grids 67 and 69 is greater than the spacing between grid 68 and the adjacent parallel end wall of the resonator. Grids 67 and 69 serve as input electrodes and define the input gap therebetween. Grid 68 and the resonator wall opposite thereto (which serves as a collector electrode) form the output electrodes and define the output gap therebetween. A cathode 71 is centered with the resonator axis adjacent grid 67, and a suitable charged reflector having a conical surface 72 is disposed adjacent grid 69.

The electron beam from cathode 71 is projected first through the lower voltage input electrode gap between grids 67 and 69 and then returned as a divergent annular beam by reflector 72 through the higher voltage output electrode gap defined by grid 68 and the coextensive parallel portion of the adjacent end wall of the resonator. Here the beam deflection is accomplished by the reflector shape without inclining the cathode. Otherwise this embodiment is the same as Figure 6.

Figure 9 has substantially the same resonator shape as Figure 1, but the stepped electrode structure is in the other end wall of the resonator instead of on the reentrant pole. Thus cylindrical resonator 73 has end wall 12' formed with stepped parallel semicircular grids 74 and 75 aligned with and parallel to circular grid 76 on the end of the reentrant pole extending from wall 13'. Grid 74 and the facing half of grid 76 form the input electrodes. Grid 75 and the other half of grid 76 form the output electrodes.

Cathode 77 and catcher electrode 78 are mounted adjacent grids 74 and 75, respectively. Reflector 79 is arranged adjacent grid 76 and is of arcuate shape so that it accomplishes the necessary directional deflection of the electron beam, so that the cathode and catcher need not be inclined as in Figure 1. In this embodiment the input electrode gap is between grids 74 and the half of grid 76 opposite thereto and the output electrode gap is between grid 75 and the half of grid 76 opposite thereto.

Figure 10 is generally the same as Figure 1 except for the cathode and collector construction. Here the cathode assembly has an emission face 79 aligned with the input electrode gap and a collector surface 81 aligned with the output gap. The shape of reflector 80 insures the illustrated required directivity of the electron beam.

Figure 11 is also substantially the same as Figure 1, except for the electrode structure. Here input electrode grids 82 and 83 are arranged parallel to the cathode emission surface 21 to reduce interception, and for the same reason output electrode grids 84 and 85 are arranged parallel to the collector electrode face 24. In other words, the beam traverses the electrodes substantially normal thereto instead of angularly as in Figure 1.

In Figure 12 the resonator and electrode arrangements are exactly the same as in Figure 9 except that magnetic beam deflecting means are used instead of the electrostatic reflectors of Figures 1-11. An arcuate tube 82 is mounted in the field free space within the pole extending from the resonator wall. This tube is of a non-magnetic conducting material such as copper. A magnet, permanent or electrically energized, is mounted with a pole face 83 arranged to produce magnetic flux lines extending outwardly of the paper generally perpendicularly to the plane of the drawings.

These magnetic flux lines bend the electron beam from cathode 77 through an arc of 180°, the radius of the arc depending on the electron velocity in the beam. Tube 82 is shaped to conform to the bending of the beam and provides an effective shield protecting the beam from undesirable stray currents.

Each of the forms of the invention diagrammatically shown in Figures 4-11, inclusive, are contained in an evacuated enclosure similar to Figures 1 or 3, which enclosure is here omitted for simplicity. Moreover, the operation of these forms of the invention beyond that above described is obviously as descibed for Figure 1, so that further discussion is unnecessary.

Figures 13, 14 and 15 diagrammatically illustrate reflex devices having larger cathode and other electrode areas affording even higher power use. These three embodiments comprise revolution of the cross-section of Figure 1 about axes A—A, B—B and C—C, outside the resonator.

In Figure 13 the resonator chamber 83 is an annulus of the illustrated cross-section about axis A—A, with reflector 84, cathode 85 and collector 86 all being continuous and annular. Similarly, grids 87, 88 and 89 are annular and continuous. Annular grid 89 and the half of annular grid 87 opposite thereto form the input electrodes and define the input gap therebetween. Annular grid 88 and the other portion of grid 87 opposite thereto form the output electrodes and define the output gap therebetween.

In Fig. 14, the resonator chamber 91 is an annulus about axis B—B, with reflector 92, cathode 93, collector 94 and grids 95, 96 and 97 all being annular and continuous. Here grid 96 and the opposite portion of grid 95 form the input electrodes and the input gap. Grid 97 and the other portion of grid 95 opposite thereto form the output electrodes and the output gap.

In Figure 15, the resonator chamber 98 is an annulus about axis C—C, with reflector 99, cathode 101, collector 102 and grids 103, 104 and 105 all being annular and continuous. Here the grid 105 and the opposite portion of grid 103 form the input electrodes and the input gap. Grid 104 and the other portion of grid 103 opposite thereto form the output electrodes and the output gap.

In each of Figures 13, 14 and 15 the cathode and collector are relatively inclined similarly to Figure 1, and the grid spacing and other features are the same as in Figure 1 except for the beam shape which is annular as shown by the arrows. The large cathode area enables large currents to be handled during higher power operation, without unduly increasing the battery voltage or the current density at the cathode surface.

Figure 16 illustrates a reflex device corresponding to revolution of the illustrated cross-section of Figure 4 about an axis D—D shown in Fig. 16. The tube is a right cylindrical metallic structure wherein the resonator space 100 is an annulus about axis D—D. The annular cathode 106, supported by insulated post 107 on the cylindrical wall of the tube, is provided with oppositely inclined emission faces similarly to Figure 4, and is shielded as by flanges 108.

An internal cylindrical partition 109 is formed with grid electrode structure 110 intermediate its ends as illustrated. The other electrodes comprise identical annular walls 111 and the annular grid structure 112, suitably supported as illustrated. In this construction, the grid 112 and the opposite portion of grid 110 are the input electrodes, while the walls 111 (serving as collector electrodes) and the remaining portion of grid 110 are the output electrodes. The input electrode gap is therefore between grids 112 and 110, and the two output electrode gaps are between grid 110 and walls 111. Cylindrical reflector 113 is centrally supported, as by radial arms 114 projecting from a rigid axial insulator post 115.

The tube of Figure 16 is completely evacuated, the electrical leads (not shown) being suitably sealed and insulated where required. Cooling fluid coils 116 extend in ample thermal contact with the exterior walls. This tube is capable of high power operation similarly to Figures 13-15. It will be apparent that the invention is of sufficient scope to embrace high power tubes constructed as figures of revolution or translation of any of the simple resonator forms disclosed in Figures 1-12.

Figure 17 illustrates in perspective a high power hollow resonator type reflex apparatus comprising an elongated generally rectangular device formed by translation of the cross-section of Figure 1 perpendicular to the plane of the paper.

For high power the device may comprise a relatively long hollow resonator 116 having the aforesaid and illustrated cross-section and having the external appearance of a rectangular metal box. Reentrant pole 117 which projects at right angles to the lower resonator wall is formed at its top with stepped grids 118 and 119 each preferably made of a series of suitably spaced bars or strips of metal. The upper wall of the resonator is similarly formed with a bar or strip grid 121 coextensive with grids 118 and 119 and parallel thereto.

Adjacent and along one side of grid 121 is suitably mounted an external strip cathode 122 having its emitting surface generally parallel to the grid; and at the other side of grid 121 an external collector electrode strip 123 is also suitably mounted. Reflector 124, which is shaped and charged to deflect the electron beam from cathode 122 as illustrated by the arrows is located within pole 117. The whole is enclosed in an evacuated envelope having suitable lead-in wire connections to the parts as in Figure 1.

The reflex device of translation in Figure 17 operates essentially the same as in Figure 1, grid 118 and the opposite portion of grid 121 defining the input electrodes, and grids 119 and the remaining portion of grid 121 defining the output electrodes. Preferably the ends of the rectangular device may be rounded beyond the grids as illustrated to assist field distribution.

Any of the various electrode and resonator arrangements and shapes embodied in the above phases of the invention may be interchanged and equivalently changed without departing in spirit from the invention. For example, the magnetic deflecting means of Figure 12 may be used in place of the electrostatic reflectors in any of the other described embodiments. The essential feature is that the electrode spacing be such as to provide the relative effective voltage levels at the input and output electrodes as explaned in connection with Figure 1. In each embodiment the external electrical circuit is preferably as shown in Figures 1 and 11.

As many changes could be made in the above construction and many apparently widely different embodiments of this invention could be made without departing from the scope thereof, it is intended that all matter contained in the above decription or shown in the accompanying drawings shall be interpreted as illustrative and not in a limiting sense.

What is claimed is:

1. Ultra high frequency apparatus comprising means defining a chamber adapted to contain an oscillating electromagnetic field having two adjacent field portions of different effective voltage, means for projecting a beam of electrons through said chamber through the field portion of lower effective voltage to subject said electrons to velocity variation by the action of said lower voltage field portion, and means included in said apparatus for returning said beam through the other of said field portions of higher effective voltage, whereby said beam is subjected to a higher effective voltage when returning through said field than when initially traversing said field.

2. An ultra high frequency device comprising means including walls defining a chamber and adapted to contain an oscillating electromagnetic field, spaced input and output electrodes in opposed walls of said chamber, means adjacent said chamber for projecting a beam of electrons therethrough at said input electrodes, and deflecting means for returning said electron beam into said chamber at said output electrodes, said output electrodes being separated from each other by a different distance from that of said input electrodes.

3. An ultra high frequency device comprising means defining a chamber adapted to contain an oscillating electromagnetic field, spaced input and output electrodes in opposed walls of said chamber, said field being substantially common between said electrodes, means adjacent said chamber for projecting a beam of electrons through said input electrodes, and deflecting means for returning said electron beam into said resonator at said output electrodes, said output electrodes being separated from each other by a smaller distance than the separation of said input electrodes.

4. The ultra high frequency device defined in claim 2, wherein said deflecting means is located externally of said chamber.

5. The ultra high frequency device defined in claim 2, wherein said deflecting means comprises a reflector electrode, and means coupled to said electrode for maintaining it at a negative potential relative to said walls.

6. The ultra high frequency device defined in claim 2, wherein said deflecting means comprises a magnetic deflector.

7. An ultra high frequency device comprising means defining a hollow resonator adapted to contain an alternating electromagnetic field, spaced input electrodes at one region of said resonator and adapted to have a predetermined effective voltage produced thereacross by said field, differently spaced output electrodes at another region of said resonator and adapted to have a higher effective voltage produced thereacross by said field, means for projecting a beam of electrons through said resonator at said input electrodes, and deflecting means for returning said electron beam through said resonator at said output electrodes.

8. Ultra high frequency apparatus comprising means including walls defining a chamber and adapted to contain an oscillating electromagnetic field, opposed electrodes in spaced walls of said chamber, said electrodes being spaced a predetermined distance in a first region and less than said predetermined distance in a second region, means for projecting a beam of electrons through said electrodes at said first region for velocity modulating said electron and means located outside said chamber and included in said apparatus for deflecting the electron beam emerging from said first region toward said electrodes at said second region for abstracting energy from said electrons at said second region.

9. The ultra high frequency device defined in claim 8, wherein the spacing of said electrodes in said first region is greater than one-half the electron wavelength and the spacing of said electrodes in said second region is less than one-half the electron wavelength, whereby the effective voltage acting on the beam between said electrodes in said second region is higher than the effective voltage acting on the beam between said electrodes in said first region.

10. High frequency apparatus comprising a cavity resonator, spaced input electrodes in opposed adjacent walls of said resonator, and output electrodes in said same walls spaced a different distance apart than said input electrodes, means included in said apparatus for projecting a stream of charged particles through said spaced input electrodes to be velocity-modulated thereby, and further means included in said apparatus for returning said velocity-modulated particles through said output electrodes to give up energy to the field therebetween.

11. High frequency apparatus comprising a cavity resonator having opposed adjacent wall sections and spaced electrode structures in said wall sections, said electrode structures being spaced apart a greater distance in a first region than in a second region, and being substantially parallel to each other in said two regions, means included in said apparatus for projecting a stream of charged particles through one of said regions to be velocity-modulated and thereafter through the other of said regions for energy abstraction.

12. High frequency apparatus comprising a cavity resonator having spaced electrode structures forming portions of the walls thereof, at least one of said electrode structures being stepped to provide regions of different spacing from the other of said electrode structures, means included in said apparatus for projecting a stream of charged particles through one of said regions to be velocity-modulated and thereafter through the other of said regions for energy abstraction.

13. High frequency apparatus comprising a substantially cylindrical resonator device and generally parallel electron permeable electrodes mounted in adjacent spaced relation in the end walls of said device, said electrodes comprising at least two regions of different spacing, means included in said apparatus for projecting a stream of charged particles through one of said regions to be velocity-modulated and thereafter through the other of said regions for energy abstraction.

14. The apparatus defined in claim 13, wherein said projecting means includes a cathode mounted adjacent the electrode in one end wall of said device for projecting electrons therethrough to be velocity-modulated, and said particle-returning means includes electron deflecting means mounted adjacent the electrode in the other end wall of said device for returning said projected electrons through the region of smaller spacing for energy abstraction.

15. High frequency apparatus comprising a cavity resonator device having walls, a set of spaced electrodes in adjacent walls of said device, a set of additional spaced electrodes in said walls, said additional electrodes substantially surrounding said first electrodes and being spaced a different distance apart than said first electrodes, means included in said apparatus for projecting a stream of charged particles through one set of said electrodes for velocity-modulating said stream and for projecting said modulated stream through the other set of said electrodes for energy abstraction.

16. Ultra high frequency apparatus comprising a generally cylindrical cavity resonator device, a first group of spaced input electrodes mounted on the end walls of said device, a second group of output electrodes mounted on said end walls and spaced apart a distance less than the spacing of said input electrodes, one of said electrode groups being substantially surrounded by the other, means included in said apparatus for projecting a stream of charged particles through said spaced input electrodes to be velocity-modulated thereby, and further means included in said apparatus for returning said velocity-modulated particles through said output electrodes to give up energy to the field therebetween.

17. The apparatus defined in claim 16, wherein said output electrodes substantially surround said input electrodes.

18. Ultra high frequency apparatus comprising means defining a cavity resonator device in the form of a figure of revolution formed by rotating a closed figure about an axis external to said closed figure, substantially continuous and distinct input and output electrode elements mounted in adjacent walls of said device, means including a substantially continuous cathode adjacent said resonator for projecting a beam of electrons through said input electrode elements for velocity modulating said beam, and deflecting means in the path of said beam for returning said beam through said output electrode elements for energy extraction.

19. Ultra-high-frequency apparatus comprising means defining a cavity resonator device in the form of a figure of revolution about an axis, substantially continuous and distinct input and output electrode elements mounted in adjacent walls of said device, means including a substantially continuous cathode adjacent said resonator for projecting a beam of electron through said input electrode elements, and deflecting means in the path of said beam for returning said beam through said output electrode elements, said resonator device, cathode and deflecting means all being substantially annular and regularly mounted about said axis.

20. Ultra-high-frequency apparatus comprising means defining a cavity resonator device in the form of a figure of revolution about an axis, substantially continuous and distinct input and output electrode elements mounted in adjacent walls of said device, means including a substantially continuous cathode adjacent said resonator for projecting a beam of electrons through said input electrode elements, and deflecting means in the path of said beam for returning said beam through said output electrode elements, said cathode substantially surrounding said device, and being adapted to project said electron beam generally radially through said input electrode elements toward said axis.

21. The apparatus defined in claim 18, wherein the output electrode elements comprise electrodes spaced apart a smaller distance than said input electrode elements.

22. High frequency apparatus comprising a cavity resonator having a pair of adjacent electron permeable walls forming portions of the boundary of the cavity defined by said resonator, said walls having two regions of different spacings defining two adjoining gaps of different lengths, and means included in said apparatus for successively projecting an electron stream through said two gaps for velocity modulation and energy extraction.

23. Apparatus as in claim 22 wherein said projecting means includes a cathode opposite one of said wall portions, and a deflector electrode opposite the other of said wall portions.

JOHN R. WOODYARD.

REFERENCES CITED

The following references are of record in the file of this patent:

UNITED STATES PATENTS

| Number | Name | Date |
|---|---|---|
| 2,128,232 | Dallenbach | Aug. 30, 1938 |
| 2,128,236 | Dallenbach | Aug. 30, 1938 |
| 2,190,515 | Hahn | Feb. 13, 1940 |
| 2,190,712 | Hansen | Feb. 20, 1940 |
| 2,200,023 | Dallenbach | May 7, 1940 |
| 2,200,330 | Engbert | May 14, 1940 |
| 2,220,840 | Metcalf | Nov. 5, 1940 |
| 2,245,627 | Varian | June 17, 1941 |
| 2,250,511 | Varian et al. | July 29, 1941 |
| 2,259,690 | Hansen et al. | Oct. 21, 1941 |
| 2,311,658 | Hansen et al. | Feb. 23, 1943 |